United States Patent
Urac

(10) Patent No.: US 11,215,070 B2
(45) Date of Patent: Jan. 4, 2022

(54) DUAL DENSITY ABRADABLE PANELS

(71) Applicant: PRATT & WHITNEY CANADA CORP., Longueuil (CA)

(72) Inventor: Tibor Urac, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 60 days.

(21) Appl. No.: 16/713,493

(22) Filed: Dec. 13, 2019

(65) Prior Publication Data

US 2021/0180467 A1 Jun. 17, 2021

(51) Int. Cl.
| | | |
|---|---|---|
| F01D 21/04 | (2006.01) | |
| F01D 11/12 | (2006.01) | |
| F01D 25/24 | (2006.01) | |
| F04D 29/52 | (2006.01) | |

(52) U.S. Cl.
CPC .......... F01D 21/045 (2013.01); F01D 11/122 (2013.01); *F01D 25/24* (2013.01); *F04D 29/526* (2013.01); *F05D 2220/323* (2013.01); *F05D 2220/36* (2013.01); *F05D 2240/14* (2013.01); *F05D 2240/307* (2013.01); *F05D 2250/283* (2013.01); *F05D 2250/294* (2013.01)

(58) Field of Classification Search
CPC ........ F01D 11/08; F01D 11/12; F01D 11/122; F01D 11/127; F01D 21/045; F01D 25/243; F01D 25/246; F05D 2240/11; F05D 2240/307; F05D 2250/283; F05D 2250/294; F05D 2220/36
See application file for complete search history.

(56) References Cited

U.S. PATENT DOCUMENTS

| | | | |
|---|---|---|---|
| 4,239,452 A | | 12/1980 | Frank, Jr. |
| 4,422,648 A | * | 12/1983 | Eaton ...................... F01D 11/12 277/415 |
| 6,203,021 B1 | * | 3/2001 | Wolfla ................... F16J 15/445 277/415 |
| 8,061,967 B2 | | 11/2011 | Marlin et al. |
| 8,821,116 B2 | * | 9/2014 | Duval ..................... F01D 5/284 415/173.4 |
| 10,132,185 B2 | * | 11/2018 | Gold ........................ F01D 25/24 |
| 10,487,847 B2 | * | 11/2019 | Veitch ................... F04D 29/164 |
| 10,858,950 B2 | * | 12/2020 | Shi .......................... F01D 11/12 |
| 10,870,152 B2 | * | 12/2020 | Le Biez ................. B22F 3/105 |

(Continued)

FOREIGN PATENT DOCUMENTS

| | | | | |
|---|---|---|---|---|
| EP | 3361053 A1 | | 8/2018 | |
| FR | 2984949 A1 | | 6/2013 | |
| FR | 2984949 A1 | * | 6/2013 | ........... F01D 25/007 |

OTHER PUBLICATIONS

Metco 601 NS Aluminum Silicon Polymer Thermal Spray Powder—Material Product Data Sheet (Year: 2021).*

(Continued)

*Primary Examiner* — Brian P Wolcott
(74) *Attorney, Agent, or Firm* — Norton Rose Fulbright Canada LLP

(57) ABSTRACT

An abradable layer for a rotor case of a gas turbine engine has a base of a high density abradable material axially spanning a central portion of the blade tip and having shallow annular pockets of a less durable abradable material of a lower density axially spanning the leading and trailing edges of the blade tip.

14 Claims, 4 Drawing Sheets

(56) References Cited

U.S. PATENT DOCUMENTS

| | | | | |
|---|---|---|---|---|
| 10,876,423 | B2* | 12/2020 | Reynolds | F04D 29/685 |
| 2012/0133079 | A1* | 5/2012 | Sykes | C08K 5/14 |
| | | | | 264/299 |
| 2015/0354392 | A1* | 12/2015 | Lipkin | F01D 11/125 |
| | | | | 415/173.4 |
| 2016/0061049 | A1 | 3/2016 | William et al. | |
| 2018/0371932 | A1* | 12/2018 | Le Biez | B22F 5/009 |
| 2019/0032504 | A1 | 1/2019 | Jun et al. | |
| 2020/0277871 | A1* | 9/2020 | Shi | F01D 5/20 |

OTHER PUBLICATIONS

Thermosil T7000 Heat-Resistant Abradable Silicone Sealant—Technical Data and Instructions (Year: 2020).*
European Search Report issued in counterpart application No. 20213937.4 dated Apr. 23, 2021.

* cited by examiner

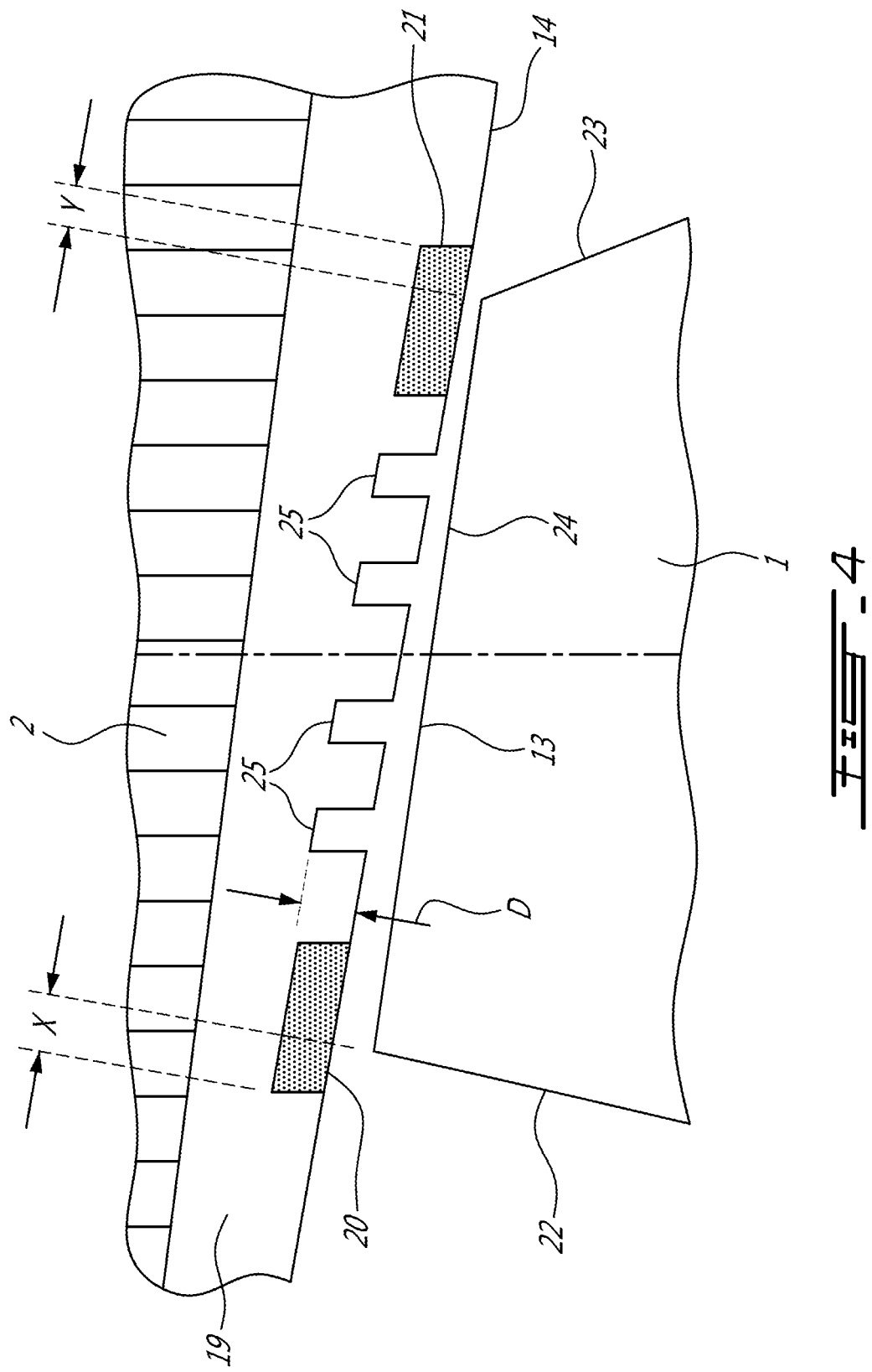

DUAL DENSITY ABRADABLE PANELS

TECHNICAL FIELD

The disclosure relates to gas turbine engines and, more particularly, to abradable panels for lining a rotor case of a gas turbine engine.

BACKGROUND

A gas turbine fan engine includes a fan case surrounding the fan blade tips to duct air into the bypass duct and the compressor of the engine. A layer of abradable material is provided on the interior of the fan case to control the gap between the fan blade tips and the interior of the fan case.

The abradable material is positioned to provide a tip clearance gap between the fan blade tips and the interior of the fan case. When the engine achieves a high operational speed, the fan blades stretch and elongate radially outwardly as a result of centrifugal stress, which may result in radial erosion of the abradable material within the interior of the fan case.

Contact between the fan blade tips and the abradable material lining the interior of the fan case imposes frictional rub loading on the rotating fan blades. The relatively thin leading edge and trailing edge of the fan blade can be deformed or damaged by such contact. In particular during FOD (foreign object damage), such as bird ingestion strikes or ice spalling events, the abradable material and tips of the fan blades may impact with solid debris causing damage and further erosion. The impact may resiliently deflect the fan blade axially thereby increasing the axial dimension of the rubbing zone on the abradable material layer.

Improvement is desirable.

SUMMARY

The disclosure describes a gas turbine engine comprising: a rotor having a plurality of blades disposed in a circumferential array for rotation about an axis, each blade having a blade tip with a central portion extending axially between a leading edge and a trailing edge; a case having an interior surface surrounding the plurality of blades, the interior surface having a base layer axially spanning the blade tip, a leading edge insert in the base layer, the leading edge insert axially spanning the leading edge of the blades, and a trailing edge insert in the base layer, the trailing edge insert axially spanning the trailing edge of the blades; wherein the base layer includes a first abradable material having a first density, and wherein the leading edge insert includes a second abradable material having a second density lower than the first density, and the trailing edge insert includes a third abradable material having a third density lower than the first density.

In a further aspect the disclosure describes a fan case for a gas turbine engine, the gas turbine engine comprising a fan having a plurality of fan blades disposed in a circumferential array and mounted for rotation about an axis, each fan blade having a blade tip with a central portion extending between a leading edge and a trailing edge; the fan case comprising: an interior surface configured to surround the plurality of fan blades, the interior surface having: 1) a base layer extending axially from a location upstream of the leading edge to a location downstream of the trailing edge relative to an airflow direction through the fan, 2) a leading edge ring extending axially from a location upstream of the leading edge to a location downstream of the leading edge, and 3) a trailing edge ring extending axially from a location upstream of the trailing edge to a location downstream of the trailing edge; wherein the base layer includes a first abradable material having a first density, and wherein the leading edge insert includes a second abradable material having a second density lower than the first density, and the trailing edge insert includes a third abradable material having a third density lower than the first density.

In a still further general aspect, there is provided a method of manufacturing a rotor case for a gas turbine engine, wherein the gas turbine engine comprises: a rotor having a plurality of blades disposed in a circumferential array and mounted for rotation about an axis, each blade having a blade tip with a central portion extending axially between a leading edge and a trailing edge; and a rotor case having an interior surface surrounding the plurality of blades, the method comprising: lining the interior surface of the rotor case with a base layer axially spanning the blade tips; installing a leading edge insert on the base layer, the leading edge insert axially spanning the leading edge; installing a trailing edge insert on the base layer, the trailing edge insert axially spanning the trailing edge; and wherein the base layer has a first abradable material having a first density and wherein the leading edge insert and the trailing edge insert have a second abradable material having a second density lower than the first density.

Further details of these and other aspects of the subject matter of this application will be apparent from the detailed description included below and the drawings.

DESCRIPTION OF THE DRAWINGS

FIG. 4 shows a detail view of the abradable material and fan blade tip.

DETAILED DESCRIPTION

Figure 1:
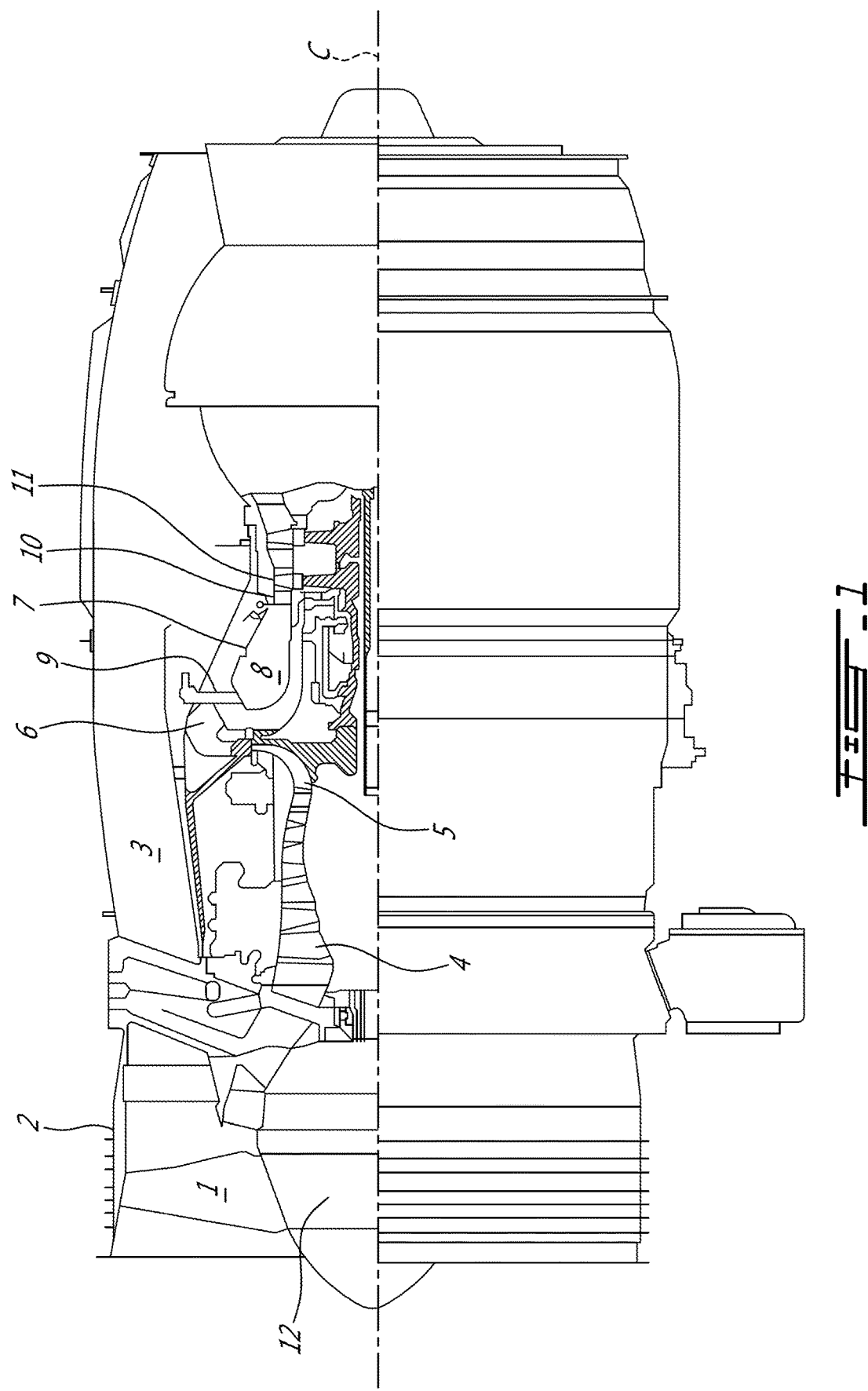
FIG. 1 shows a partial axial cross-section view of an example turbo-fan gas turbine engine.

FIG. 1 shows an axial cross-section through an aircraft engine. According to the illustrated embodiment, the aircraft engine is a turbo-fan gas turbine engine. However, it is understood that the aircraft engine could adopt various other forms. According to the illustrated example, air intake into the engine passes over fan blades 1 in a fan case 2 and is then split into an outer annular flow through the bypass duct 3 and an inner flow through a low-pressure axial compressor 4 and a high-pressure centrifugal compressor 5. Compressed air exits the compressor section through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling the turbines to eventually mix with the hot gases from the combustor and pass over the nozzle guide vane 10 and turbine blades 11 before exiting the tail of the engine as exhaust.

Figure 2:
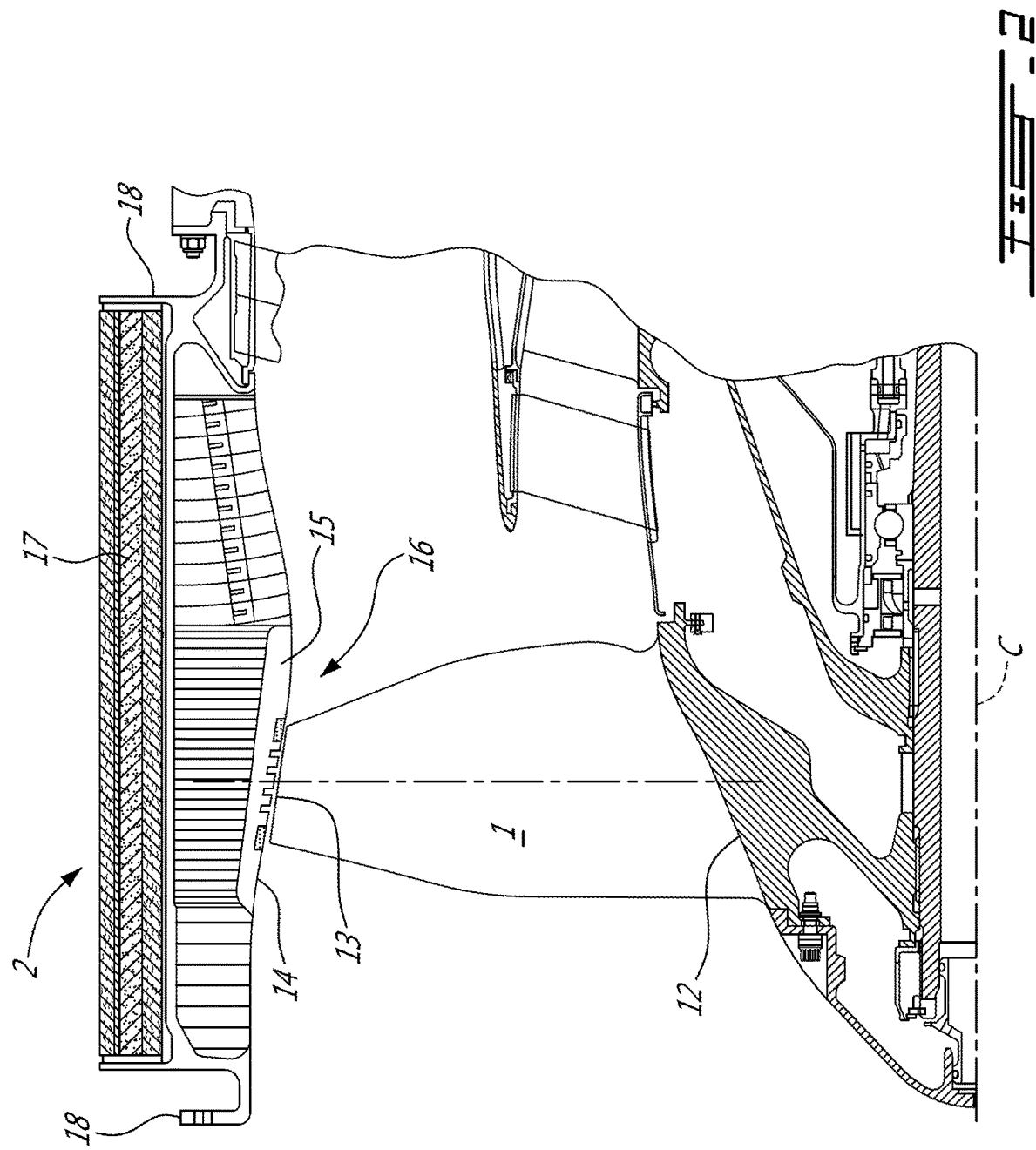
FIG. 2 shows a partial axial cross-section view of the fan blade and fan case.
Figure 3:
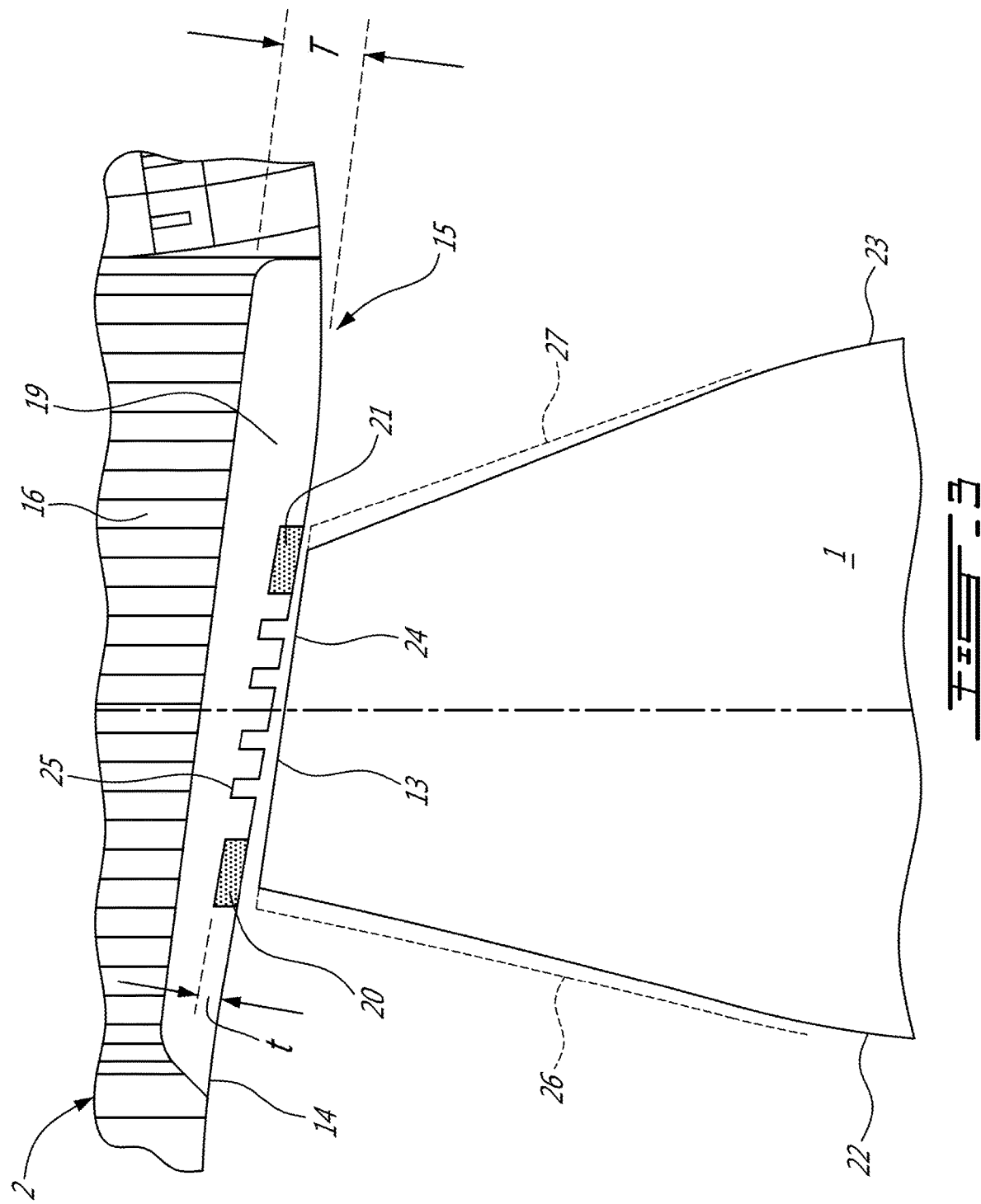
FIG. 3 shows an axial cross-section view of the abradable material lining the interior of the fan case and the adjacent fan blade tip.

The present description and drawings relate to the fan case 2 and fan blades 1 shown in the example of FIGS. 2-4.

The fan 12 has a plurality of fan blades 1 disposed in a circumferential array and mounted for rotation about the engine centerline C. Each fan blade 1 has a blade tip 13 on a radially outward end of the blade airfoil. The fan case 2 has an interior surface 14 surrounding the circumferential array of fan blades 1 to contain and direct air flow into the engine and bypass duct 3. The fan case 2 in the example of FIG. 2 includes an abradable layer 15, a compressible honeycomb structure 16 and an outer containment belt 17 supported by a cylindrical metal housing 18. The abradable layer 15 is of interest in this description. The elements (16, 17 and 18) of the fan case 2 may vary considerably without affecting the abradable layer 15.

As will be seen hereafter, the abradable layer has a deep durable base of a high density abradable material axially overlapping a central portion of the blade tip and at least one shallow annular pocket of a less durable abradable material of a lower density axially spanning the leading and/or trailing edges of the blade tip. Use of a higher density more durable abradable material can be desirable to minimize erosion, reduce blade tip gaps and improve the fan stall margin. A higher density abradable material will improve erosion resistance and FOD capability of the abradable material. However the higher density abradable material will increase the frictional rubbing load imposed on the blade tips and will increase the damage to the thinner leading edges and trailing edges. The use of lower density abradable material above the leading edge and/or the trailing edge of the blades allow to reduce the blade rub loads at the leading and trailing edges where the blade is most sensitive to blade damage.

Now referring to FIGS. 3-4, it can be appreciated that the abradable layer 15 comprises an annular base layer 19, a leading edge insert 20 and a trailing edge insert 21. According to the illustrated embodiment, the inserts 20, 21 form continuous rings on the interior surface of the case 2. The blade 1 has an airfoil shape with a leading edge 22 and a trailing edge 23. The fan blade tip 13 has a central portion 24 with relatively wide airfoil cross section shape arcuately merging with the leading edge 22 and a trailing edge 23. During high stress maneuvers, bird strike or icing events, the fan blade 1 may be deflected axially forward or rearward which is indicated by dashed outlines in FIG. 3.

FIG. 4 shows a detail of the abradable layer 15 of the fan case 2 with the annular base layer 19 disposed radially outward of the central portion 24 of the fan blades 1. It can be appreciated that the annular base layer 19 extends axially from a location upstream of the leading edge 22 to a location downstream of the trailing edge 23 relative to a flow direction of the air through the fan 12. The leading edge ring 20 is disposed radially outward of the leading edges 22 of the fan blades 1 and the trailing edge ring 21 is disposed radially outward of the trailing edges 23. The leading edge ring 20 extends axially from a location upstream of the leading edge 22 at the tip of the fan blade 1 to a location downstream thereof. Likewise, the trailing edge ring 21 extends axially from a location upstream from the trailing edge 23 at the tip of the fan blade to a location downstream thereof.

To improve durability, erosion resistance and foreign object damage resistance, a relatively high density abradable material is used to form the annular base layer 19. Since the leading edges 22 and trailing edges 23 of the fan blades 1 are relatively thin and tend to be damaged more easily, the leading edge ring 20 and trailing edge ring 21 that rub against the blade tip 13 near those edges are formed of an same or different abradable material having a relatively lower density. Accordingly, the dual density abradable materials (high density base layer 19 and low density rings 20, 21) serve to reduce the rub loads near the leading and trailing edges 22, 23 while retaining the durability benefit of the high density abradable in the base layer 19 that engages the central portion 24 of the blade tip 13 between the leading and trailing edges 22, 23. Further if the relatively lower density abradable rings 20-21 are damaged or worn, chiselling or gouging out the shallow pockets from the harder high density base layer 19 in which the rings 20-21 are embedded and replacement of the lower density abradable material(s) into the shallow annular pockets is a local repair and a rapid maintenance task.

As can be appreciated from FIG. 3, the deflection of the fan blade 1 shown in dashed lines is the reason for marginally extending the axial length of the leading edge ring 20 by dimension X (see FIG. 4) forwardly and for marginally extending the axial length of the trailing edge ring 21 rearwardly by dimension Y rearwardly beyond the leading edge 22 and trailing edge 23 respectively. Otherwise there is a risk that the deflected leading and trailing edge tip corners of the blade 1 engage with the harder high density base layer 19 which could cause blade corner damage or wear. Accordingly during events that result in deflection of the fan blade 1, the blade tip 13 at the leading edge 22 and trailing edge 23 will contact only the lower density material of the leading edge and trailing edge rings 20, 21 and not engage the higher density base layer 19. Damage and wear of the blade tip 13 at the leading edge 22 and trailing edge 23 can be reduced as a result.

An option is shown in FIGS. 3-4 where the annular base layer 19 has been treated with (i.e. has therein) a plurality of axially spaced-apart annular grooves 25 (four in the illustrated example) having a radial depth of dimension D. The grooves 25 tend to reduce the rub load on the central portion 24 of the blade tip 13 because less area of the blade tip 13 is in contact with the high density abradable of the annular base layer 19 (i.e. there is no blade tip 13 contact in the area of the grooves 25).

In the illustrated example, the leading edge ring 20 and the trailing edge ring 21 are embedded flush within the annular base layer 19 to match the axial contour of the fan blade tip 13. As seen in FIG. 3, the annular base layer 19 extends forward of the leading edge ring 20 and extends rearward of the trailing edge ring 21. The rings 20-21 of softer lower density abradable material are contained and protected within the harder higher density abradable material of the annular base ring 19. The rings 20-21 are embedded flush with only the internal wearing surface exposed to engage in contact with the blade tip 13.

As indicated in FIG. 3, the annular base layer 19 has a radial thickness T which is relatively thick. The leading edge ring 20 and the trailing edge ring 21 have a radial thickness t which is relatively thin. The thickness t is selected to be slightly greater than the expected maximum radial outward expansion of the blade tip 13 during operation of the engine and during major impact events such as bird strikes or ice spalling. The dashed lines in FIG. 3 indicate a forward fan blade deflection limit 26 and a rearward fan blade deflection limit 27 which may occur during extreme manoeuvers, bird strikes or ice spalling. To engage the blade tip 13 at the leading and trailing edges 22, 23 during such deflection causing events, the leading edge ring 20 extends axially forward of the leading edge 22 beyond a forward fan blade deflection limit 26 (dashed line) and the trailing edge ring 21 extends axially rearward of the trailing edge 23 beyond a rearward fan blade deflection limit 27 (dashed line). Accordingly, the forward fan blade deflection limit 26 and the rearward fan blade deflection limit 27 define axial boundaries of a blade tip rub zone. The radial thickness t of the rings 20-21 defines a maximum radial erosion boundary of the blade tip rub zone. In the embodiment illustrated, the leading edge ring 20 and the trailing edge ring 21 have a radial thickness t that is less than or equal to the radial depth of the annular grooves 25. However, other configurations are equally possible such as more than four grooves 25 having a more shallow depth, or grooves 25 of triangular or undulating curved profiles.

The dual abradable fan casing liner provides a method of improving durability combining the durability benefits of a high density material in rub contact with the central portion 24 of the blade tip 13 with the benefit of reduced rub loads on blade tip 13, near the leading edge 22 and trailing edge 23, due to the low density material used in the leading edge ring 20 and the trailing edge ring 21.

According to one aspect, first and second shallow pockets are formed in the annular base layer 19 to respectively receive the leading edge ring 20 radially outward of the leading edges 22 of the blade tips 13 and the trailing edge ring 21 radially outward of the trailing edges 23 of the blade tips 13. The base layer 19 is made of a higher density abradable material whereas the leading edge ring 20 and the trailing edge ring 21 are made of a lower density abradable material. According to one embodiment, the high density material has a density which is at least 30% higher than the lower density material. It is noted that the leading edge ring and the trailing edge ring can be made of a same or different low density material. Optionally, the annular base layer 19 may be treated with a plurality of annular grooves 25 having a radial depth t. The grooves 25 can be referred to as "casing treatment". They produce a localized flow disturbance as well as allow pressure to move from pressure to suction side re-energizing boundary layers and prevent flow separation. It is used to improve stall margin. The use of a higher density material in the casing treatment zone where the grooves are defined improve erosion and FOD resistance.

An example method of lining the fan case 2 can include manufacturing a plurality of trays, where each tray is a circumferential segment of the interior surface 14 of the fan case 2. For example a generally rectangular tray can have cylindrical and/or frustoconical inner surface and/or outer surface. The trays can initially be filled with the high density abradable material by thermal spraying, casting, or sintering of alloy metal particles for example. The annular grooves 25 in the high density abradable material may be formed in the annular base layer 19 by moulding or machining. Likewise an annular leading edge pocket in the high density abradable material can be moulded or machined and then filled with the low density abradable material to form the leading edge ring 20. An annular trailing edge pocket in the high density abradable material can be moulded or machined and then filled with the low density abradable material to form the trailing edge ring 21. Once the rings 20-21 are completed, the trays can be installed onto the interior surface of the fan case 2 in a circumferential array secured with bolts, rivets or adhesive.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A gas turbine engine comprising:
a rotor having a plurality of blades disposed in a circumferential array for rotation about an axis, each blade having a blade tip with a central portion extending axially between a leading edge and a trailing edge; and
a case having a base layer surrounding the plurality of blades and axially spanning each blade tip, the base having a first radial thickness, a leading edge insert in the base layer, the leading edge insert axially spanning the leading edge of each blade of the plurality of blades and extending axially forward of the leading edge beyond a forward blade deflection limit, and a trailing edge insert in the base layer, the trailing edge insert axially spanning the trailing edge of each blade of the plurality of blades and extending axially rearward of the trailing edge beyond a rearward blade deflection limit, the leading edge insert and the trailing edge insert having a second radial thickness, the first radial thickness being greater than the second radial thickness;
wherein the base layer includes a first abradable material having a first density, and wherein the leading edge insert includes a second abradable material having a second density lower than the first density, and the trailing edge insert includes a third abradable material having a third density lower than the first density; and
wherein the forward blade deflection limit and the rearward blade deflection limit define axial boundaries of a blade tip rub zone, the second radial thickness defining a radial erosion boundary of the blade tip rub zone.

2. The gas turbine engine according to claim 1 wherein the base layer has a plurality of annular grooves having a radial depth.

3. The gas turbine engine according to claim 1 wherein the leading edge insert and the trailing edge insert are embedded flush within the base layer and the second abradable material is the same as the third abradable material.

4. The gas turbine engine according to claim 1 wherein the plurality of blades are fan blades.

5. The gas turbine engine according to claim 2 wherein the leading edge insert and the trailing edge insert have a second radial thickness less than or equal to the radial depth of the plurality of annular grooves.

6. A fan case for a gas turbine engine, the gas turbine engine comprising a fan having a plurality of fan blades disposed in a circumferential array and mounted for rotation about an axis, each fan blade having a blade tip with a central portion extending between a leading edge and a trailing edge; the fan case comprising:
an interior surface configured to surround the plurality of fan blades, the interior surface having: 1) a base layer extending axially from a location upstream of the leading edge to a location downstream of the trailing edge relative to an airflow direction through the fan, 2) a leading edge ring extending axially from a location upstream of the leading edge to a location downstream of the leading edge, and 3) a trailing edge ring extending axially from a location upstream of the trailing edge to a location downstream of the trailing edge;
wherein the base layer includes a first abradable material having a first density, and wherein the leading edge insert includes a second abradable material having a second density lower than the first density, and the trailing edge insert includes a third abradable material having a third density lower than the first density; and
wherein the base layer has a plurality of annular grooves having a radial depth, the leading edge ring and the trailing edge ring having a second radial thickness less than or equal to the radial depth of the plurality of annular grooves.

7. The fan case according to claim 6, wherein the leading edge ring and the trailing edge ring are received in respective pockets defined in the base layer.

8. The fan case according to claim 7, wherein the leading edge ring and the trailing edge ring are embedded in the base layer.

9. The fan case according to claim 6, wherein the plurality of annular grooves are disposed axially between the leading edge ring and the trailing edge ring.

10. A method of manufacturing a rotor case for a gas turbine engine,
wherein the gas turbine engine comprises: a rotor having a plurality of blades disposed in a circumferential array and mounted for rotation about an axis, each blade having a blade tip with a central portion extending axially between a leading edge and a trailing edge; and a rotor case having an interior surface surrounding the plurality of blades, the method comprising:
lining the interior surface of the rotor case with a base layer axially spanning each blade tip;
treating the base layer with a plurality of annular grooves having a radial depth;
installing a leading edge insert on the base layer, the leading edge insert axially spanning the leading edge;
installing a trailing edge insert on the base layer, the trailing edge insert axially spanning the trailing edge;
wherein the base layer has a first abradable material having a first density and wherein the leading edge insert and the trailing edge insert have a second abradable material having a second density lower than the first density; and
wherein the leading edge insert and the trailing edge insert having a second radial thickness less than or equal to the radial depth of the plurality of annular grooves.

11. The method according to claim 10 comprising:
manufacturing a plurality of trays, each tray being a circumferential segment of the interior surface of the rotor case;
filling the plurality of trays with the first abradable material;
forming the plurality of annular grooves in the first abradable material;
forming an annular leading edge pocket in the first abradable material and filling with the second abradable material to form the leading edge insert;
forming an annular trailing edge pocket in the first abradable material and filling with the second abradable material to form the trailing edge insert; and
installing the plurality of trays onto the interior surface of the rotor case in a circumferential array.

12. The method according to claim 11 wherein at least one of: forming the plurality of annular grooves; forming an annular leading edge pocket; and forming an annular trailing edge pocket, comprises at least one of: moulding; and machining of the first abradable material.

13. The method according to claim 11 wherein at least one of: filling the plurality of trays with the first abradable material; filling with the second abradable material to form the leading edge insert; and filling with the second abradable material to form the trailing edge insert, comprises at least one of: thermal spraying; casting; and sintering.

14. The method according to claim 11 wherein installing the plurality of trays onto the interior surface of the rotor case includes securing the trays with one of: bolts; rivets; and adhesive.

* * * * *